Feb. 27, 1962
P. SHAJENKO
3,023,303
WELDING PROCESS AND APPARATUS
Filed May 25, 1959
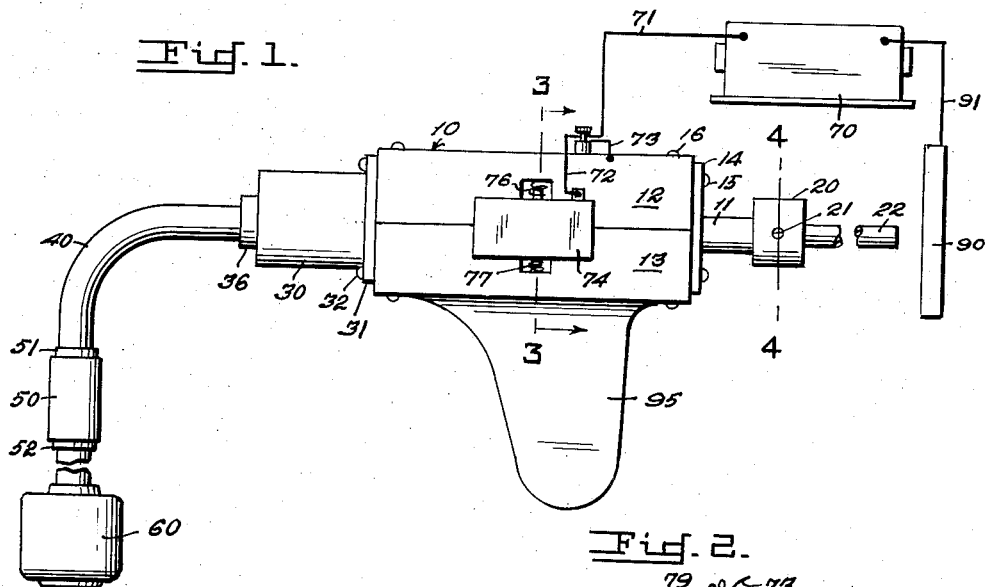
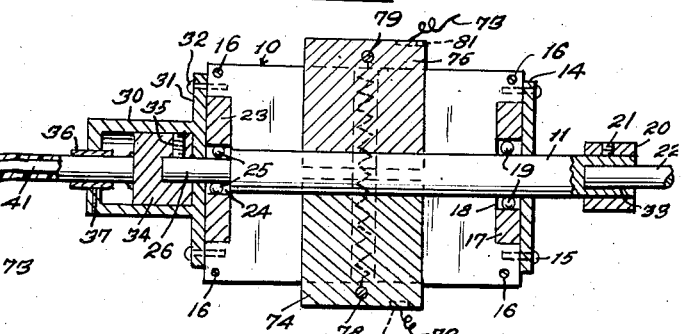
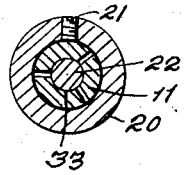
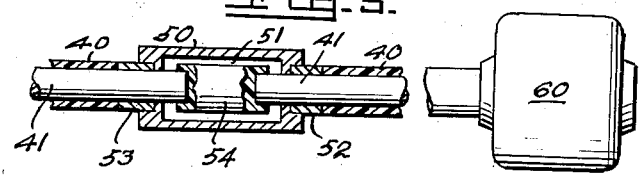
INVENTOR.
Petro Shajenko
BY United States Patent Office 3,023,303
Patented Feb. 27, 1962

3,023,303
WELDING PROCESS AND APPARATUS
Petro Shajenko, 26218 Crystal, Center Line, Mich.
Filed May 25, 1959, Ser. No. 815,757
2 Claims. (Cl. 219—130)
(Granted under Title 35, U.S. Code (1952), sec. 266)

The invention described herein may be manufactured and used by or for the Government of the United States for governmental purposes without the payment of any royalty whatever.

This invention relates to metal arc welding and more particularly to a new and novel arc welding process and apparatus therefor including a welding rod holder device.

In the present practice of arc welding a number of processes and devices are known, such as the metal arc, submerged arc, and carbon arc processes.

Many factors contribute to the determination as to the process most feasible and economical for use in connection with a given welding problem. For example, in the carbon arc process, the arc is responsible only for providing the heat energy necessary to complete the fusion of the weldment. An independent filler metal may or may not be used, as desired. In the metal arc process having a consumable electrode, the arc not only provides the necessary heat energy, but also directs molten metal particles from the welding rod into the weldment.

The arc processes utilized may involve shielding of the molten filler metal particles being deposited and of the molten pool of the workpiece against the corrosive effects produceable thereon by the oxygen and nitrogen constituents of the atmosphere. An arc may be shielded by completely enveloping it with an inert gas that will not enter into chemical combination with the molten metal and that, at the same time, will prevent the molten metal from coming into contact with the atmosphere. To provide this shielding protection, the electrode welding rod may be coated with a material which, upon heating, decomposes to provide the protective inert gas. The protective gas shield, on the other hand, may be furnished from an independent source such as that as may be found in the bare, tape, gas and flux shielded welding processes. The practice of my invention is intended to encompass arc welding processes wherein filler metal particles are transmitted across the arc into the weld.

In the normal operation of metal arc welding processes wherein the metal is transmitted across the arc to the weld, the workpiece acts as one electrode and the welding rod acts as the other electrode. The arc is established by contacting the two electrodes and withdrawing the welding rod a short distance. Heat generated by the arc establishes a molten pool of metal formed of the metal of the workpiece, and, when the melting temperature of the consumable welding rod is reached, molten particles thereof are transmitted from the arcing tip of the rod to the molten pool of the metal being welded which retains these particles, if a proper temperature is maintained in the welding area. The welding rod tip, under normal conditions, melts evenly about its end surface and may be brought in close proximity to the metal being welded, thus giving protection to the arc from atmospheric and other effects. Only high-energy, randomly-directed molten particles of the rod escape the molten pool under normal conditions.

Heretofore, difficulties have been encountered in metal arc welding processes involving metal deposit into the weld from across the arc owing to the fact that the arc is subjected to exteriorly initiated deflecting forces, the effect of which is generally known as "arc blow."

The arc, being a gaseous electrical current conducting medium, can be affected by certain mechanical, thermal and electromagnetic forces. Mechanical forces such as those due to high wind velocity in the vicinity of the arc, and thermal effects due to improper temperature control of the welding material can produce arc deflection. These causes of arc deflection, once detected, can be easily eliminated.

However, electromagnetic forces producing arc deflection are more complex in their origin and in their effects on the arc. Magnetic fields in the vicinity of the arc may be due to welding current, residual magnetism in the workpiece or any external magnetic field.

The arc, when subjected to these deflecting forces shifts not only from the desired welding point on the workpiece but also from the end of the welding rod to the side thereof in the direction of the arc deflecting force. Consequently, the welding rod is consumed from a side rather than uniformly from the end, and the particle deposits of the rod are transmitted elsewhere than to the desired welding point.

With side consumption of the rod, the arc length is increased and the heated area of the workpiece becomes greater with the attendant undesirable effects thereof. Moreover, the amount of heat per unit area at the desired welding point is insufficient to retain the metal particles which are deposited by the rod.

The overall effect of arc deflection is a poor quality weld performed at very slow welding speeds.

By employment of my invention which provides for rotation of the welding rod about its longtudinal axis at a substantially constant speed during the welding operation, the aforementioned difficulties are overcome, and a weld of superior quality is obtained. The effects of arc deflection are substantially eliminated in that the arc is stabilized, the metal deposits from the welding rod are transmitted uniformly and side melting of the welding rod is eliminated, as well as sticking of the rod to the workpiece.

Furthermore, even in the absence of arc deflecting forces, rotation of the electrode producing filler metal produces a weld of higher quality than one produced without rotation of the electrode. In this case, rotation tends to produce a centrifugal force acting on the molten metal globular particles prior to transfer thereof from across the arc to the workpiece. This centrifugal force tends to approach and offset the gravitational force acting on the globular particle, and the particle does not take the drop shape normally taken by a liquid under gravitational force. Rather the globule tends to stretch out substantially perpendicular to the rod longitudinal axis. Since the centrifugal force tends to offset the gravitational effect, the only forces acting to transmit minute metal particles from across the arc to the workpiece are explosive forces due to high temperatures generated by the arc. Consequently, the depth of the penetration of the particles into the molten pool of the workpiece will be greater, and, since droplet formations are offset due to centrifugal force, the rotating welding rod can be brought closer to the workpiece, thus producing a higher quality weld. While not intending to advance or be bound by a theoretical rationale for the higher quality weld produced using a rotating welding rod, the foregoing is stated merely as a possible reasonable explanation thereof.

It is therefore among the objects of my invention to substantially eliminate the effects of arc deflecting forces present in metal arc welding on filler metal transferring across the arc.

It is another object of this invention to stabilize the arc during metal arc welding where filler metal particles are transmitted from across the arc.

It is an additional object of this invention to provide uniform transfer of molten filler metal particles across the arc.

It is a further object of this invention to eliminate side melting of the welding rod during the arc welding process.

Another object of my invention is to eliminate the possibility of the welding rod sticking to the workpiece.

It is a still further object of this invention to produce an acceptable quality weld at economical welding speeds in the presence of magnetic arc-deflecting forces.

The specific nature of the invention as well as other objects and advantages thereof will clearly appear from a description of a preferred embodiment, as shown in the accompanying drawings, wherein:

FIGURE 1 is a side elevation view of welding apparatus useful in carrying out the objects of my invention.

FIGURE 2 is a partial horizontal view showing details of FIGURE 1.

FIGURE 3 illustrates a cross sectional view taken along lines 3—3 of FIGURE 1.

FIGURE 4 is a cross sectional view taken along lines 4—4 of FIGURE 1.

FIGURE 5 is an exaggerated cross sectional view illustrating the insulating means of the preferred embodiment.

Referring more particularly to the drawings wherein like reference characters refer to like or corresponding parts throughout the several views, as seen in FIGURE 1, there is illustrated a preferred embodiment of my rotatable welding rod apparatus.

Housing 10 may be constructed on insulating material such as a phenolic resinous material and is bored along its horizontal central axis, as shown, to provide a recess for receiving rotatable shaft 11. Housing 10 may be horizontally sectioned into parts 12 and 13 for ease of assembly and secured together as by screws 16. Cover plate 14 is secured to housing 10 by means such as screws 15 and bored to receive rotatable shaft 11. Cover plate 14 prevents accumulation of dust and debris in the bore of housing 10. A collar 20 slip fits concentrically over rotatable shaft 11 and is tapped to receive a threaded screw or wing nut 21 which engages rotatable shaft 11 and press holds shaft 11 against welding rod 22 to effect rotation of welding rod 22. The structure of collar 20 and nut 21 and the functions thereof in relation to shaft 11 and welding rod 22 are described hereinafter in connection with FIGURES 2 and 4.

At the other end of housing 10, cover plate 31, which may be integral with housing 30, is secured to housing 10 as by screw means 32. A flexible drive shaft 41 (FIGURE 2) housed in line 40 is coupled to rotatable shaft 11 in housing 30. The drive shaft 41 and line 40 may be any available commercial type of rotatable drive shaft assembly. A bushing 36 secures the cover of flexible drive shaft line 40 to housing 30.

An insulator assembly 50 may be positioned in drive shaft cable line 40 to insulate the welding apparatus from the drive shaft and welding currents.

Rotation of the rotatable drive shaft 41 housed in flexible cable line 40 is effected through means 60. Means 60 may be either an A.C. or D.C. motor, since the particular type of driving current source forms no feature of my invention, except to the extent that some means to drive rotatable drive shaft 41 are necessary. Shaft 41 and flexible cable line 40 are connected to motor 60 in any conventional manner. Line 40 is connected to insulator assembly 50 through bushings 51 and 52.

Means 70, utilized to supply welding current to welding rod 22, may be either an A.C. or D.C. current source means, the particular type of current source not being a feature of my invention, except to the extent that a current source is necessary to the operation thereof.

Welding current is supplied by welding generator 70 or other suitable source to rotatable shaft 11 thence to welding rod 22 through conductors 71, 72 and 73 and brushes 74 and 75 (FIGURE 3). Brushes 74 and extend through slots in housing 10, and retaining springs 76 and 77 urge brushes 74 and 75 in electrical contact with rotatable shaft 11. Welding generator 70 is connected to the workpiece 90 through conductor 91. A handle 95, provided to facilitate ease of manipulation of the welding device, completes the apparatus.

In FIGURE 2, rotatable shaft 11 is shown positioned in a central axial bore in housing 10. Bearing housing 17 is shown seated in a counterbore of housing 10 and is bored through its horizontal axis centrally to permit unrestricted passage of rotatable shaft 11 and is counterbored to receive bearing race 18. Ball bearings 19 positioned in race 18 engage shaft 11 to facilitate rotation thereof while in operation. Cover plate 14 secured to housing 10 by means such as screws 15 firmly seats bearing housing 17 in the counterbore of housing 10. A central axial bore of cover plate 14 is aligned with the bores of bearing housing 17 and housing 10 to permit unrestricted passage of shaft 11.

Similarly, the other end of housing 10 is counterbored to receive a bearing housing 23. Bearing housing 23 is bored along its central axis to receive bearing raceway 24 and axially aligned with the central bore of housing 10. Ball bearings 25 are positioned in raceway 24 and engage an elongation 26 of rotatable shaft 11 which extends through the bore of housing 30 and terminates in a seat defined by a bore in cylindrical coupling 34. Elongation 26 is secured to coupling 34 by means of set screw 35. Thus, it can be seen that shaft 11 is rotatable about its longitudinal axis on bearings 19 and 25. Flexible drive shaft 41 extending through the bores of bushing 36 and housing 30 is secured to coupling 34 as by welding, brazing or soldering. The cover of flexible drive shaft cable line 40 is secured to bushing 36 and set screw 37 holds bushing 36 in stationary engagement with housing 30. Thus, when flexible drive shaft 41 rotates, coupling 34 and rotatable shaft 11 impart rotary motion to welding rod 22.

Centrally located in housing 10 are provided slots as seats for brushes 74 and 75 (FIGURES 1, 2 and 3). As shown in FIGURE 3, the brushes 74 and 75 are grooved complementary to the circumference of rotatable shaft 11 and are urged in contact therewith by the action of retaining springs 76 and 77 which extent through chamfered bores in housing 10. Retaining spring 76 is secured to brush 74 by pin 78, extends thorugh the bore of housing 10 and is secured to brush 75 by pin 79. Retaining spring 77 is secured to brush 74 by pin 78, extends through the lower bore in housing 10 and is secured to brush 75 by pin 79. Thus, an equal and counter-balancing elastic load is applied to brushes 74 and 75 for urging and maintaining friction contact between brushes 74 and 75 and rotatable shaft 11. Conductor 72 is secured at one end to brush 74 by contact 80, and conductor 73 is secured at one end to brush 75 by contact 81. Conductors 72 and 73 terminate at a common junction contact 82 located on housing 10. There, conductor 71 contacts conductors 72 and 73. Welding current is thereby supplied to welding rod 22 through conductors 71, 72 and 73, brushes 74 and 75, and rotatable shaft 11.

As shown in FIGURES 2 and 4, rotatable shaft 11 is bored to provide a seat for receiving welding rod 22 as at 33. A "Y" cut, the depth of the bore, is made in shaft 11. Collar 20 slip fits over shaft 11 and is tapped to receive wing nut 21. Threading of wing nut 21 forces the end thereof against a section of the "Y" cut of shaft 11, and, in turn, that section is forced against welding rod 22, positioned in bore 33, and thereby welding rod 22 is held firmly while the device is in operation.

Insulator assembly 50, as shown in FIGURE 5, divides line 40 and rotatable drive shaft 41 into two sections and comprises an insulator housing 50 defining an interior chamber 51. The cover of the portion of flexible drive shaft cable line 40 extending from motor 60 is secured to bushing 52. The drive shaft 51 extends through the bore of bushing 52 and is secured to a rotatable cylindrical insulator 54 in chamber 51. The cover of the section of cable line 40 leading from housing 30 is secured to a bushing 53 and the drive shaft 51 and is secured to the other end of rotatable cylindrical insulator 54. Chamber 51 is machined so as to permit free rotation of shaft 41 and insulator 54. Bushings 52 and 53 are secured as by welding, brazing or soldering to housing 50. Thus, the welding apparatus is electrically insulated from the drive means current, and the welding current is prevented from being shunted to all parts of the apparatus.

In operation, energization of motor 60 causes rotation of flexible drive shaft 41, and thereby rotary motion is imparted to coupling 34, rotatable shaft 11 and welding rod 22 about their respective longitudinal axes. Welding generator 70 is energized and the rotating tip of welding rod 22 brought in contact with the workpiece 90 thereby closing the welding circuit and the arc is "struck." Thus, the welding process is initiated.

In tests conducted, it was found that rotation of the welding rod at speeds of approximately 650 r.p.m. produced excellent welds on ½ inch armor plate. The above speeds are illustrative only and not intended to represent critical speeds.

Insulator assembly 50 prevents welding current from being shunted to any part of the welding device. Rotation of the welding rod 22 stabilizes the arc, substantially prevents arc blow, prevents the tip of the welding rod from sticking to the workpiece, permits the arc length to be shortened, provides a uniform deposit in the molten pool on the workpiece of metal particles from the rod tip, limits the heated area of the workpiece and produces a weldment of better quality. Thus, by employment of my invention which provides, for rotation of the metal deposit rod during the welding operation, the problems of the prior art are overcome.

While a preferred form of the invention has been shown and described, various modifications and substitution of equivalents will occur to those skilled in the art after a study of the foregoing disclosure. Hence, the disclosure should be taken in an illustrative, rather than a limiting sence, and it is the desire and intention to reserve all modifications within the scope of the subjoined claims.

I claim:
1. In combination, arc welding apparatus comprising a consumable rotatable metal electrode, electrical circuit means connecting said electrode to a metal workpiece, a source of current for energizing an arc between said electrode and workpiece, a housing of insulating material, a rotatable shaft in said housing, means connecting one end of said shaft engaging to said electrode for rotation thereof, a flexible rotatable drive shaft engaging said shaft for rotation thereof, constant speed electrical means for continuously rotating said drive shaft, insulator means disposed in said shaft whereby electrical current is prevented from being shunted to all parts of the welding apparatus.

2. Arc welding apparatus comprising a housing said housing being an insulator, said housing having a longitudinal bore and a pair of transverse slots formed therein, a conductor in the form of a cylindrical shaft rotatably mounted in the bore in said housing, a brush slidably mounted in each of the transverse slots in the housing, the ends of said brushes being grooved complementary to the outer surface of said shaft, spring means connecting said brushes for pulling said brushes into contact with said shaft, a generator, a first conductor connecting said generator to said brushes, a second conductor connecting said generator to a metallic work piece, a consumable all metal electrode, means removably connecting said electrode to said shaft, said generator being adapted to produce an electric current to produce an arc between said electrode and the work piece, a rotatable flexible drive shaft, means securing one end of the drive shaft to said cylindrical shaft, an electric motor, means connecting said motor to said shaft, said flexible shaft being separated by means to insulate the welding apparatus from the current used to operate the electric motor.

References Cited in the file of this patent

UNITED STATES PATENTS

| | | |
|---|---|---|
| 1,840,601 | Peck | Jan. 12, 1932 |
| 1,955,001 | Hopkins | Apr. 17, 1934 |
| 1,963,868 | Sandelowsky et al. | June 19, 1934 |
| 2,106,937 | Tobert | Feb. 1, 1938 |
| 2,163,657 | Beckman | June 27, 1939 |
| 2,636,147 | Anderson | Apr. 21, 1953 |
| 2,878,694 | Stratton et al. | Mar. 24, 1959 |
| 2,958,349 | McNutt | Nov. 1, 1960 |

FOREIGN PATENTS

| | | |
|---|---|---|
| 149,951 | Great Britain | Dec. 16, 1921 |
| 404,503 | Great Britain | Jan. 18, 1934 |